United States Patent
Ito et al.

(10) Patent No.: US 12,012,103 B2
(45) Date of Patent: Jun. 18, 2024

(54) VEHICLE CONTROL METHOD AND VEHICLE CONTROL DEVICE

(71) Applicant: Nissan Motor Co., Ltd., Yokohama (JP)

(72) Inventors: Atsushi Ito, Kanagawa (JP); Katsuhiko Degawa, Kanagawa (JP); Takahiro Nojiri, Kanagawa (JP); Tatsuya Shino, Kanagawa (JP); Shuhei Emoto, Kanagawa (JP); Shuko Ishimaru, Kanagawa (JP); Toshihiro Asai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 403 days.

(21) Appl. No.: 17/276,681

(22) PCT Filed: Sep. 21, 2018

(86) PCT No.: PCT/IB2018/001176
§ 371 (c)(1),
(2) Date: Mar. 16, 2021

(87) PCT Pub. No.: WO2020/058739
PCT Pub. Date: Mar. 26, 2020

(65) Prior Publication Data
US 2021/0269041 A1 Sep. 2, 2021

(51) Int. Cl.
*B60Q 1/34* (2006.01)
*B60Q 1/50* (2006.01)
(Continued)

(52) U.S. Cl.
CPC .. *B60W 30/18163* (2013.01); *B60W 50/0097* (2013.01); *B60W 2540/20* (2013.01);
(Continued)

(58) Field of Classification Search
CPC ....... B60W 30/18163; B60W 50/0097; B60W 2540/20; B60W 2554/4041;
(Continued)

(56) References Cited

U.S. PATENT DOCUMENTS 9,475,491 B1 * 10/2016 Nagasaka ....... B60W 30/18163
2009/0088925 A1 4/2009 Sugawara et al.
(Continued)

FOREIGN PATENT DOCUMENTS

| JP | 2009-78735 A | 4/2009 |
| JP | 2015-066963 A | 4/2015 |
| WO | 2017/159509 A1 | 9/2017 |

*Primary Examiner* — Ian Jen
*Assistant Examiner* — Hossam M Abd El Latif
(74) *Attorney, Agent, or Firm* — Young Basile Hanlon & MacFarlane, P.C.

(57) ABSTRACT

A vehicle control method executed by a processor for controlling a subject vehicle includes: acquiring, from a sensor for detecting a state of surroundings of the subject vehicle, detection data of another vehicle traveling in an adjacent lane adjacent to a travel lane in which the subject vehicle is traveling, and setting, on the adjacent lane, a target point for the subject vehicle to change a lane from the travel lane to the adjacent lane based on a position relationship between the subject vehicle and the other vehicle, specifying the other vehicle that is located behind the target point as a rear vehicle, and starting blinking of the direction indicator of the subject vehicle when a rear end of the subject vehicle is located ahead of the front end of the rear vehicle.

6 Claims, 4 Drawing Sheets

(51) Int. Cl.
*B60R 21/00* (2006.01)
*B60R 21/0134* (2006.01)
*B60W 30/14* (2006.01)
*B60W 30/16* (2020.01)
*B60W 30/18* (2012.01)
*B60W 40/02* (2006.01)
*B60W 40/105* (2012.01)
*B60W 50/00* (2006.01)

(52) U.S. Cl.
CPC ............... *B60W 2554/4041* (2020.02); *B60W 2554/802* (2020.02); *B60W 2554/804* (2020.02); *B60W 2720/106* (2013.01)

(58) Field of Classification Search
CPC ..... B60W 2554/802; B60W 2554/804; B60W 2720/106; B60W 40/00; B60W 40/106; B60W 2050/0005; B60W 2420/00; B60W 2720/10; B60W 2754/50; B60W 30/095; B60W 30/14; B60W 30/16; B60W 30/18; B60R 21/00; B60R 21/0134; B60Y 2300/18166; B60Y 2400/30; B60Q 1/50; B60Q 1/346; B60Q 1/34; B60Q 2300/112; B60Q 2300/43
USPC .......................................................... 701/25
See application file for complete search history.

(56) References Cited

U.S. PATENT DOCUMENTS

| | | | |
|---|---|---|---|
| 2015/0025770 A1* | 1/2015 | Blake | B60W 30/18163 701/93 |
| 2015/0203024 A1* | 7/2015 | Kagerer | B60W 50/14 702/158 |
| 2017/0329338 A1* | 11/2017 | Wei | B60W 30/095 |
| 2018/0129206 A1* | 5/2018 | Harada | G05D 1/0061 |
| 2018/0162416 A1* | 6/2018 | Honda | B60W 50/14 |
| 2019/0092333 A1 | 3/2019 | Ishioka | |

* cited by examiner

VEHICLE CONTROL METHOD AND VEHICLE CONTROL DEVICE

TECHNICAL FIELD

The present invention relates to a vehicle control method and a vehicle control device.

BACKGROUND

Conventionally, the following technique has been known (for example, JP 2009-78735). The technique calculates a target speed toward the lane change standby position, controls the speed of a subject vehicle based on the target speed, and determines that the lane change assistance condition is satisfied when the speed control of the subject vehicle has not been continued for a predetermined time. Then, after the lane change support condition is satisfied, the technique turns a winker on to clearly indicate a merge intention to other vehicles.

SUMMARY

For example, in the above prior art, there is the problem below when the subject vehicle is accelerated from the rear of another vehicle and performs the lane change at a position in front of the other vehicle, from a state in which the subject vehicle is traveling in one lane of the two lanes and the other vehicle is traveling in the other lane of the two lanes. There is the problem that when the lane change support condition is satisfied and the winker is operated in a state where the subject vehicle is located behind the other vehicle, it is impossible for the other vehicle to grasp which position the subject vehicle wants to merge into. As a result, the subject vehicle cannot easily inform the other vehicle of the merging intention of the subject vehicle.

The problem to be solved by the present invention is to provide a vehicle control method and a vehicle control device that facilitates informing the other vehicle of a merging intention of the subject vehicle when the subject vehicle joins an adjacent lane.

The present invention solves the above problem acquires detection data of another vehicle traveling in an adjacent lane, sets, on the adjacent lane, a target point for a subject vehicle to change a lane from a travel lane to the adjacent lane based on the position relationship between the subject vehicle and the other vehicle, specifies the other vehicle that is located behind the target point as a rear vehicle and starts blinking of the direction indicator of the subject vehicle when a rear end of the subject vehicle is located ahead of the front end of the rear vehicle. Thus, the present invention solves the above problem by starting blinking of the direction indicator at a timing at which the occupant of the rear vehicle can visually recognize the blinking of the direction indicator.

According to the present invention, when the subject vehicle merges the lane at the front position of the other vehicle, the subject vehicle can easily inform the other vehicle of the merging intention of the subject vehicle.

DETAILED DESCRIPTION

Hereinafter, a vehicle control method and a vehicle control device according to one or more embodiments of the present invention will be described with reference to the drawings. The present embodiment will be described by exemplifying a vehicle control device mounted on a vehicle.

Figure 1:
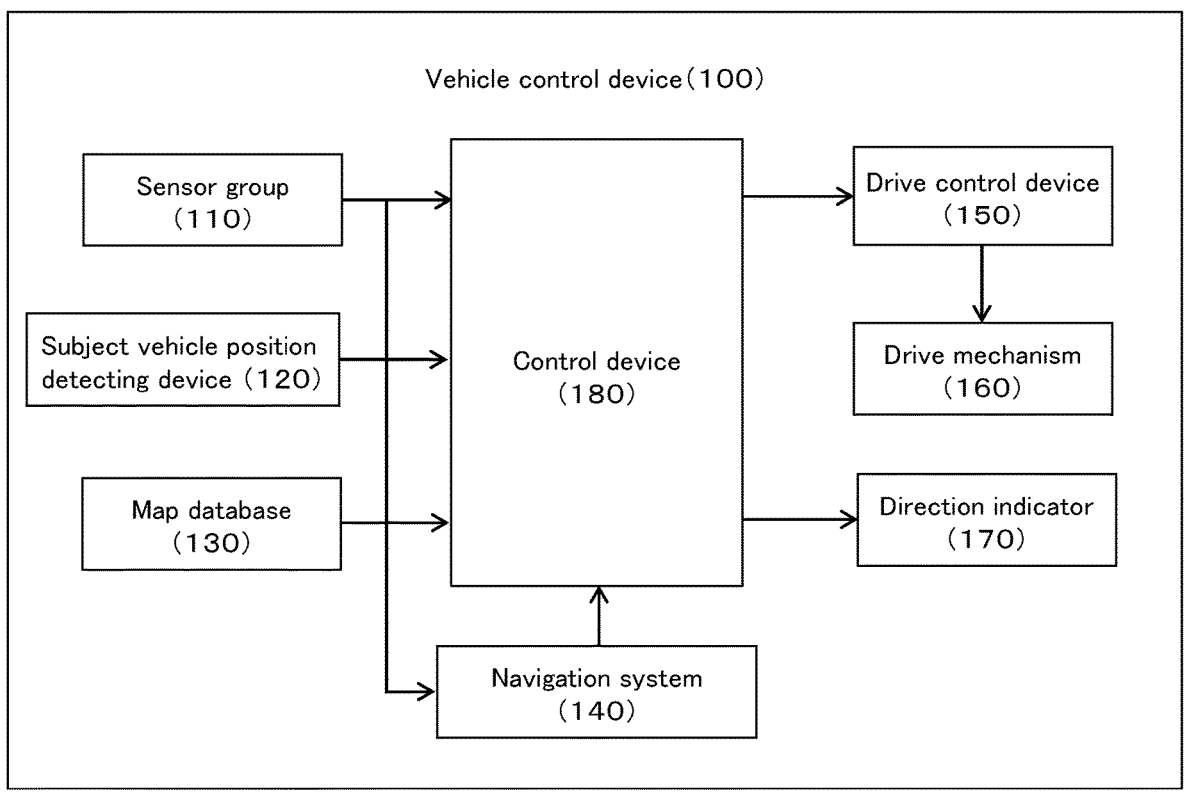
FIG. 1 is a configuration diagram showing a configuration of a vehicle control device according to the present embodiment.

FIG. 1 is a diagram showing a configuration of a vehicle control device 100 according to one or more embodiments of the present invention. As shown in FIG. 1, the vehicle control device 100 according to the present embodiment includes a sensor group 110, a subject vehicle position detecting device 120, a map database 130, a navigation system 140, a drive control device 150, a drive mechanism 160, a direction indicator 170, and a control device (processor) 180. These devices are connected by CAN (Controller Area Network) or other on-board LANs to exchange information with each other.

The sensor group 110 has an external sensor for detecting a state (external state) around the subject vehicle and an internal sensor for detecting a state (internal state) of the subject vehicle. Examples of the external sensor includes, for example, a front camera for imaging the front of the subject vehicle, a rear camera for imaging the rear of the subject vehicle, a front radar for detecting an obstacle in front of the subject vehicle, a rear radar for detecting an obstacle in the rear of the subject vehicle, and a side radar for detecting an obstacle existing in the side of the subject vehicle. The front camera is a monocular camera unit mounted on the upper portion of the windshield and behind the room mirror. The front camera may be a compound eye camera unit. The front radar is a radar or laser scanner capable of recognizing surrounding objects ahead. The side radar and rear radar are four radars installed at each right and left corner of the inside of the front and rear bumpers, respectively, and recognize the object of all directions together with the front camera. Incidentally, the side radar and the rear radar may be a camera or a laser scanner. The number of radars is not limited to four as long as an object can be recognized in all directions. The internal sensors include a vehicle speed sensor for detecting the vehicle speed of the subject vehicle, an acceleration sensor for detecting the acceleration of the subject vehicle, an in-vehicle camera for imaging the interior of the subject vehicle, a yaw angle sensor for detecting the relative direction of the subject vehicle relative to the road surface, and a steering angle sensor for detecting the steering angle of the steering wheel. The vehicle speed sensor detects the vehicle speed from the rotational speed of the axle and the rotational speed of the transmission. The acceleration sensor is a MEMS sensor, and it detects the acceleration in the traveling direction of the vehicle. Incidentally, the acceleration sensor 4 need not to be a MEMS sensor, or the acceleration may be determined by differentiating the value of the vehicle speed obtained from the vehicle speed sensor instead of the acceleration obtained from the sensor. Incidentally, the external sensor and the internal sensor may be configured to use one of the plurality of sensors described above, or may be configured to use a combination of two or more types of the sensors. The detection result (detection data) of the sensor group 110 is output to the navigation system 140 and the control device 180. As a result, the navigation system 140 and the control device 180 acquire the external information and the traveling information.

Objects detected by the sensor group 110 include, for example, bicycles, motorcycles, vehicles (hereinafter also referred to as other vehicles), on-road obstacles, traffic lights, road markings (including lane markings), and pedestrian crossings. For example, when there is another vehicle traveling around the subject vehicle, the sensor group 110 detects the direction in which the other vehicle exists and the distance to the other vehicle based on the position of the subject vehicle, and the relative speed of the other vehicle based on the vehicle speed of the subject vehicle. The sensor group 110 detects the vehicle speed, yaw angle, and steering angle of the subject vehicle. Further, for example, when the subject vehicle is traveling in a specific lane, the sensor group 110 detects a travel lane in which the subject vehicle is traveling (hereinafter, also referred to as a subject lane) and a lane located on the side of the subject lane (in the vehicle width direction) and adjacent to the subject lane (hereinafter, also referred to as an adjacent lane). The subject vehicle lane and adjacent lanes are divided by lane boundaries, and the sensor group 110 detects the lane by specifying a lane boundary line (a line such as a white line) from the captured image using an image recognition technology or the like.

The subject vehicle position detecting device 120 is a device for acquiring position information indicating the current position of the subject vehicle. The subject vehicle position detecting device 120, for example, is composed of a GPS unit and a gyro sensor and the like. The subject vehicle position detecting device 120 detects radio waves transmitted from a plurality of communications satellite by the GPS unit to periodically acquire the position information of the subject vehicle, and detects the present position of the subject vehicle based on the acquired position information of the subject vehicle, the angle change information acquired from the gyro sensor, and the vehicle speed acquired from the vehicle speed sensor (not shown). The position information acquired by the subject vehicle position detecting device 120 is output to the navigation system 140 and the control device 180. As a result, the navigation system 140 and the control device 180 acquire position information.

The map database 130 stores map information. The map information includes road information and traffic rule information. The road information is defined by nodes and links connecting between nodes. The links are identified at the lane level.

In the road information of present embodiment, the road type, road width, road shape, whether or not going straight ahead is possible, the priority relationship of progress, whether or not overtaking is possible (whether or not entering an adjacent line is possible), whether or not changing the lane is possible, and other information about the road are stored correspondingly for each identification information of each road link. Further, in the road information, information on the position of the intersection, the approach direction at the intersection, the type of the intersection, and other information on intersections are stored correspondingly for each identification information of each road link.

The map information stored in the map database 130 may be high-definition map information suitable for automatic driving. The high-definition map information may be generated based on information acquired in real time using the sensor group 110. In the present embodiment, the automatic driving indicates a driving operation in which the driving entity is not composed of only the driver. For example, the driving entity includes a vehicle controller (not shown) for supporting the driving operation performed by the driver together with the driver, or the driving entity includes a vehicle controller (not shown) for performing the driving operation on behalf of the driver. The automatic operation is performed in compliance with traffic laws and regulations.

The navigation system 140 is a system for guiding the driver of the subject vehicle by indicating the route from the present position of the subject vehicle to the destination based on the information of the present position of the subject vehicle. Various types of information are input to the navigation system 140 from the sensor group 110, the subject vehicle position detecting device 120, and the map database 130. When the driver or other occupant inputs the destination information of the subject vehicle, the destination information is input to the navigation system 140. The navigation system 140 generates a travel route from the present position of the subject vehicle to the destination based on the input various information. Then, the route guidance information for guiding the travel route generated by the navigation system 140 is output to the driver and other occupants in a display and the like.

The drive control device 150 controls the travel of the subject vehicle. The drive control device 150 includes a brake control mechanism, an accelerator control mechanism, an engine control mechanism, and HMI (human interface) device and the like. A control signal is input to the drive control device 150 from the control device 180 to be described later. The drive control device 150 executes, in accordance with the control of the control device 180, automatic operation of the subject vehicle by controlling the operation of the drive mechanism 160 (including the operation of an internal combustion engine in the case of an engine vehicle, the operation of an electric motor in the case of an electric vehicle system, and the torque distribution between an internal combustion engine and an electric motor in the case of a hybrid vehicle, including the operation of a brake) and the operation of a steering actuator and the like. The drive control device 150, in accordance with a control signal from the control device 180, may control the moving direction of the subject vehicle by controlling the braking amount of each wheel of the vehicle. The control of each mechanism may be performed completely automatically, or may be performed in a manner to assist the driving operation of the driver. The control of each mechanism can be interrupted or stopped by an interventional operation of the driver. The travel control method by the drive control device 150 is not limited to the above-described control method, and other well-known methods can be used.

The drive mechanism 160 includes an internal combustion engine and/or motor, and a braking mechanism. The direction indicator 170 is a device for indicating the direction of the course change to the surroundings at the time of the course change.

The control device 180 includes a ROM (Read Only Memory) storing a program for controlling the travel of the subject vehicle, a CPU (Central Processing Unit) for executing a program stored in the ROM, and a RAM (Random Access Memory) for functioning as an accessible storage device. As the operation circuits, MPU (Micro Processing Unit), DSP (Digital Signal Processor), ASIC (Application Specific Integrated Circuit, and FPGA (Field Programmable Gate Array) can be used instead of or together with CPU (Central Processing Unit). In the present embodiment, the drive control device 150 and the control device 180 is divided into two controllers, the drive control device 150 and the control device 180 may be constituted in one controller.

The control device 180 has a vehicle state acquisition function, a target point setting function, a target vehicle specifying function, a target area setting function, a travel control function, and a direction indicator control function by executing a program stored in the ROM by the CPU.

Here, a concrete scene when the control device 180 controls the vehicle by executing various functions will be described. The subject vehicle is traveling in one lane (travel lane) of a plurality of lanes, and another vehicle is traveling in the other lane (adjacent lane). The other vehicle on adjacent lane may be one or two or more. In such a state, in order to merge at a position ahead of the other vehicle traveling in the adjacent lane, the subject vehicle controls the vehicle speed so as to approach the position to be a lane change destination ahead of the other vehicle on the travel lane. Then, the subject vehicle blinks the direction indicator to inform other vehicles located in the rear of the subject vehicle of the merging intention. The control device 180 performs various functions in order to respond to such a scene. Each function will be described below.

The vehicle state acquisition function will be described. The control device 180 acquires detection data including information detected by the sensor group 110 from the vehicle speed sensor, the steering angle sensor, and the like included in the sensor group 110. The detection data includes information (information indicating the vehicle state of the subject vehicle) such as the vehicle speed, yaw angle, and steering angle of the subject vehicle. The control device 180 acquires information on the present position of the subject vehicle from the subject vehicle position detecting device 120. Thus, the control device 180 acquires the detection data including the information on the vehicle state of the subject vehicle such as the vehicle speed, present position, and attitude angle. The control device 180 acquires the detection data including information on the vehicle state of a plurality of other vehicles located around the subject vehicle from cameras, radars, and the like included in the sensor group 110. The vehicle state of the other vehicle is indicated by the position and/or vehicle speed of the other vehicle, etc. The control device 180, from the vehicle state of the subject vehicle and the vehicle state of the other vehicle, calculates the position relationship between the subject vehicle and the other vehicle, and the relative speed of the other vehicle relative to the subject vehicle respectively.

The target point setting function will be described. The control device 180 sets a target point for the subject vehicle to perform the lane change on the lane to be a lane change destination based on the position relationship between the subject vehicle and the other vehicle. The target point is set at a position ahead of the other vehicle traveling in the adjacent lane. When a plurality of other vehicles are traveling in the adjacent lane, the control device 180 compares the space in front of each other vehicle and sets the target point in the area with the longest space which is vacant in the direction along the lane.

The target vehicle specifying function will be described. The control device 180 identifies other vehicles traveling in the adjacent lanes based on the position relationship between the subject vehicle and other vehicles. The control device 180 sets the vehicle located behind the target point as the target vehicle. The target vehicle is a vehicle which is a target for merging in front of the vehicle when the subject vehicle changes the lane. Further, the control device 180 identifies the front vehicle located ahead of the target point and the rear vehicle located behind the target point as the target vehicle respectively when setting the target point between the plurality of vehicles. When three or more other vehicles are traveling in the adjacent lane around the subject vehicle, the control device 180 calculates the inter-vehicle distance between each vehicle, for example, identifies the other vehicle located ahead of and behind the widest area between the vehicle as the target vehicle.

The target area setting function will be described. The control device 180 sets a lane change possibility area between a plurality of target vehicles identified by the target vehicle specifying function. When the other vehicle is not located ahead of the target point and the other vehicle is located only behind the target point, the lane change possibility area is set in front of the target vehicle located behind the target point on the adjacent lane. Further, when the target vehicles are located ahead of and behind the target point respectively, the lane change possibility area is set on the adjacent lane between the target vehicle located ahead of the target point and the target vehicle located behind the target point. The lane change possibility area includes the merging position (target point) where the subject vehicle merges. The vehicle change possibility area has at least a distance equal to or larger than a necessary inter-vehicle distance for lane change. The necessary inter-vehicle distance indicates a lower limit value of the inter-vehicle distance necessary for performing lane change, and is defined by a length in a traveling direction of the vehicle or a direction along the lane. The necessary inter-vehicle distance specifies a sufficient inter-vehicle distance when the subject vehicle changes lane at a position ahead of the rear vehicle.

The travel control function will be described. The control device 180 controls the travel of the subject vehicle by the travel control function. The control device 180 calculates the vehicle speed as a vehicle control value indicating the vehicle speed of the subject vehicle so that the position of the subject vehicle is located ahead of the front end of the other vehicle based on the vehicle state of the subject vehicle acquired by the vehicle state acquiring function, and controls the output torque of the driving mechanism 160 so that the present vehicle speed of the subject vehicle matches the vehicle control value. Further, the control device 180 may identify the lane marks of the subject lane based on the detection result of the sensor group 110, and control the traveling position in the vehicle width direction of the subject vehicle so that the subject vehicle travels in the subject lane (so-called lane keeping control). The control device 180 performs steering control for lane change after blinking the direction indicator. The control device 180 controls the steering actuator such that the subject vehicle moves from the travel lane to the lane change possibility area while maintaining the present vehicle speed of the subject vehicle. When the movement of the subject vehicle into the lane change possibility area is completed, the control device 180 terminates the lane change control.

The direction indicator control function will be described. The control device 180 starts blinking of the direction indicator of the subject vehicle when the rear end of the subject vehicle is located ahead of the front end of the target vehicle.

Figure 2:
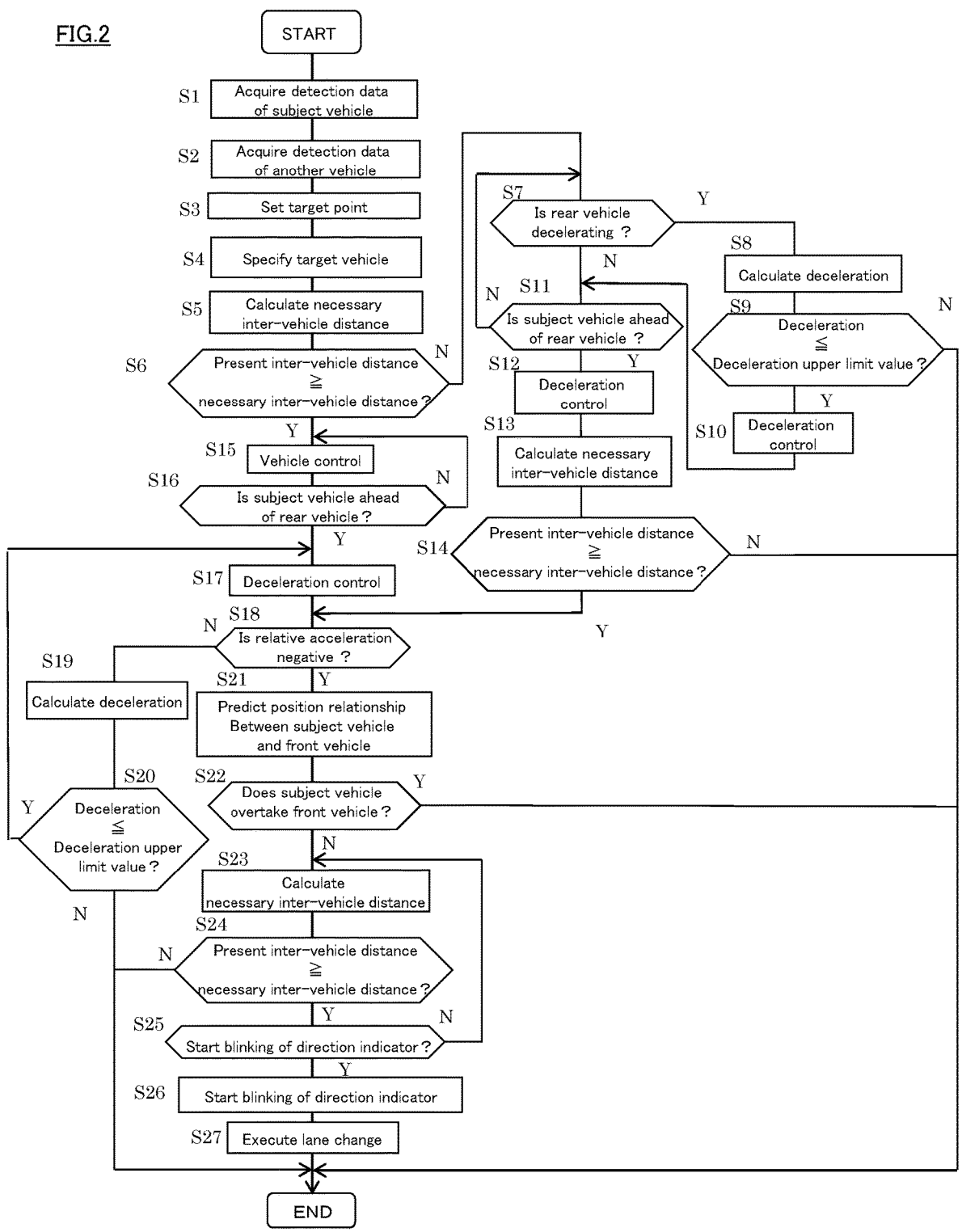
FIG. 2 is a flowchart illustrating a control flow of the control device.
Figure 3:
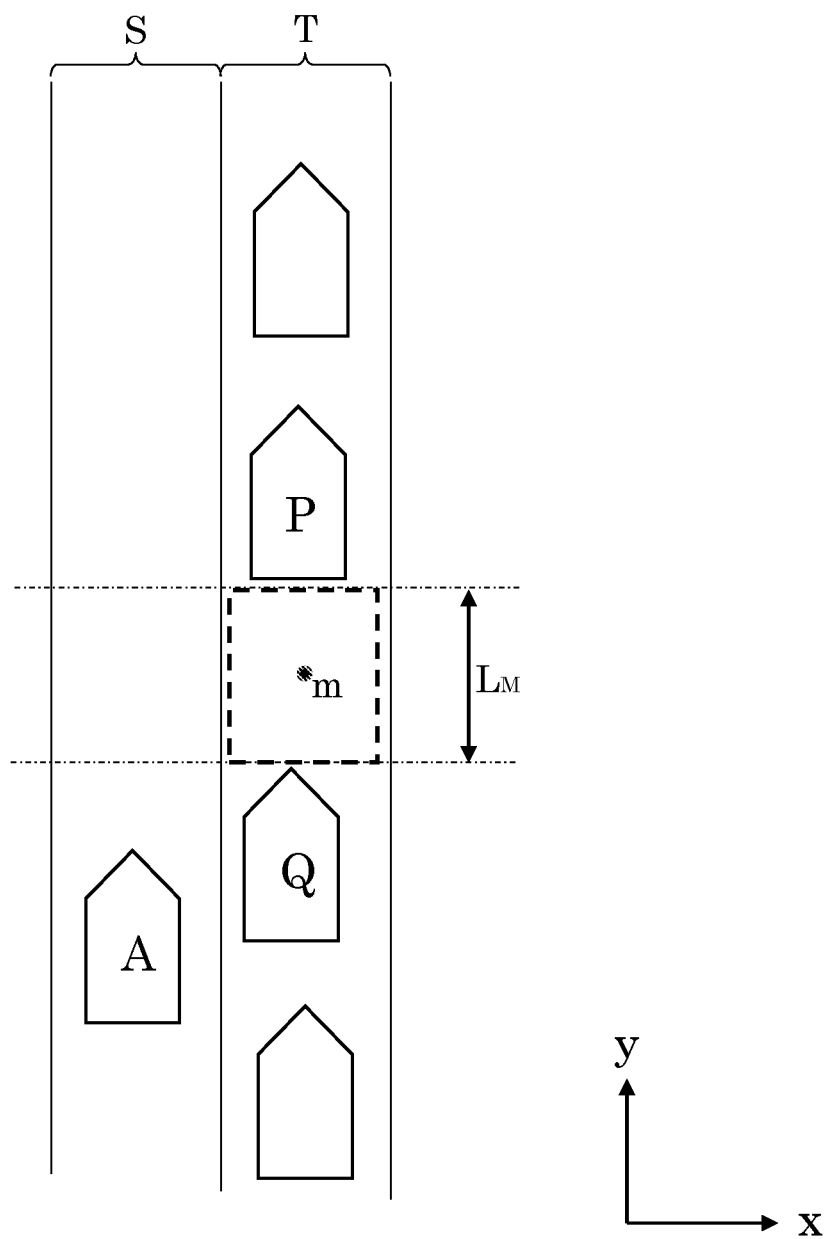
FIG. 3 is a diagram illustrating a scene in which the subject vehicle is approaching from the rear of the rear vehicle in order to execute a lane change.

Next, with reference to FIGS. 2 and 3, the control flow of the control device 180 will be described. FIG. 2 is a flowchart showing a control flow of the control device 180. FIG. 3 is a diagram for explaining a scene in which the subject vehicle approaches the target vehicle from the rear of the target vehicle and performs a lane change in front of the target vehicle. FIG. 3 shows a scene before the subject vehicle performs the lane change. In FIG. 3, the x axis direction is the vehicle width direction, and the y axis direction is the traveling direction of the vehicle. In the following description, the control flow will be described in the case of illustrating, as an example, a scene in which the subject vehicle performs the lane change to the space between a plurality of other vehicles, but the other vehicle need not to be located ahead of the target point to be the lane change destination. Further, the control process by the control device 180 can be applied to a scene in which the subject vehicle approaches the target vehicle from the rear of the target vehicle and performs the lane change in front of the target vehicle.

The control flow shown in FIG. 2 is executed when the control device 180 determines that lane change is necessary, or when the user performs the operation for the lane change. The control device 180 determines that lane change is necessary when the travel path of the subject vehicle includes a merging point, and the present position of the subject vehicle is located a predetermined distance behind the merging point. The other method may be used as the method for determining whether or not the lane change is necessary. The operation by the user is, for example, an operation of a switch or the like for executing the automatic driving mode in order to perform lane change.

In step S1, the control device 180 acquires detection data including the information of the present position of the subject vehicle from the subject vehicle position detecting device 120. Further, the control device 180 acquires detection data including the information on the vehicle speed, acceleration and the like of the subject vehicle from the sensor group 110. Thus, the control device 180 acquires the detection data including the information on the vehicle state of the subject vehicle. In step S2, the control device 180 acquires detection data of a plurality of other vehicles located around the subject vehicle from the sensor group 110. As shown in FIG. 3, the subject vehicle A is traveling at a position behind the other vehicle Q (rear vehicle). In the example of FIG. 3, the subject vehicle A is traveling in the travel lane S. The control device 180 of the subject vehicle A specifies other vehicles traveling in the adjacent lane T. Incidentally, the control device 180, while executing the following control process from the steps S3 onwards, acquires detection data relating to the vehicle state of the subject vehicle and other vehicles, and appropriately uses the detection data in the control process from the step S3 onwards.

In step S3, the control device 180 sets a target point in front of the other vehicle on the adjacent lane based on the vehicle state of the subject vehicle and the vehicle state of the other vehicle. In the example of FIG. 3, since the front vehicle P and the rear vehicle Q have the longest inter-vehicle distance between them of the four other vehicles located on the adjacent lane, the control device 180 sets the target point m in front of the rear vehicle Q.

In step S4, the control device 180 specifies the other vehicle located behind the target point as a target vehicle. The control device 180 identifies the other vehicle located ahead of and behind the target point as the target vehicle when setting the target point between a plurality of other vehicles.

In step S5, the control device 180 calculates the necessary inter-vehicle distance based on the vehicle state of the target vehicle located ahead of the target point, the vehicle state of the target vehicle located behind the target point and the vehicle state of the subject vehicle. Specifically, when the vehicle speed of the subject vehicle is equal to or higher than the vehicle speed of the front vehicle, the control device 180 calculates the necessary inter-vehicle distance ($L_{MLIM}$) by using the following equation (1). When the vehicle speed of the subject vehicle is less than the vehicle speed of the front vehicle, the control device 180 calculates the necessary inter-vehicle distance ($L_{MLIM}$) using the following equation (2).

[Equation 1]

$$L_{MLIM}=v_0 \times 1.5 + v_1 \times 1.5 + (v_0-v_2)\times 6 + l \quad (1)$$

[Equation 2]

$$L_{MLIM}=v_0 \times 1.5 + l \quad (2)$$

Note that, $v_0$ indicates the vehicle speed of the subject vehicle, $v_1$ indicates the vehicle speed of the rear vehicle (the target vehicle in the rear), $v_2$ indicates the vehicle speed of the front vehicle (the target vehicle in the front), and l indicates the total length of the subject vehicle.

The above equation is an equation for defining a sufficient inter-vehicle distance when the subject vehicle performs the lane change in front of the rear vehicle, and the inter-vehicle distance is determined by the vehicle speed, the inter-vehicle time and the time required to change lane. In the above equations (1) and (2), the coefficient (1.5) multiplied by the vehicle speed represents the inter-vehicle time. The time required to change lane represents the time required for the subject vehicle to reach the target point from the time when starting blinking of the direction indicator of the subject vehicle. In the third term of Equation (1), the coefficient (6) which is multiplied by the value of the vehicle speed ($v_0$) of the subject vehicle minus the vehicle speed ($v_2$) of the front vehicle (corresponding to the relative speed) represents the time required to change lane. Then, the third term in equation (1) represents the inter-vehicle distance that is expected to decrease during lane change. In equation (1), since the vehicle speed of the subject vehicle is higher than the vehicle speed of the front vehicle, and the inter-vehicle distance between the subject vehicle and the front vehicle decreases when the subject vehicle is performing the lane change, the length corresponding to the third term is included in the necessary inter-vehicle distance. On the other hand, in Equation (2), since the vehicle speed of the subject vehicle is lower than the vehicle speed of the front vehicle, and the inter-vehicle distance between the subject vehicle and the front vehicle does not decrease when the subject vehicle is performing the lane change, the length corresponding to the third term is not included in the necessary inter-vehicle distance.

In the example of FIG. 3, the control device 180 calculates the necessary inter-vehicle distance ($L_{MLIM}$) using the above equation (1) or (2) based on the vehicle speed $v_0$ of the subject vehicle A, the vehicle speed $v_1$ of the rear vehicle Q, the vehicle speed $v_2$ of the front vehicle P, and the total length l of the subject vehicle. Incidentally, when there is no front vehicle and/or rear vehicle, assuming that the vehicle position is infinite, the necessary inter-vehicle distance can be defined.

In step S6, the control device 180 calculates the inter-vehicle distance between the front vehicle and the rear vehicle based on the position of the front vehicle and the position of the rear vehicle, and compares the calculated inter-vehicle distance with the necessary inter-vehicle distance. In the example of FIG. 3, the control device 180 compares the inter-vehicle distance between the front vehicle P and the rear vehicle Q ($L_M$) with the necessary inter-vehicle distance ($L_{MLIM}$). When the present inter-vehicle distance ($L_M$) is equal to or greater than the necessary inter-vehicle distance ($L_{MLIM}$), the control device 180 executes the control process in step S15. When the present inter-vehicle distance ($L_M$) is less than the necessary inter-vehicle distance ($L_{MLIM}$), the control device 180 executes the control process in step S7.

When the present inter-vehicle distance ($L_M$) is less than the necessary inter-vehicle distance ($L_{MLIM}$), the subject vehicle decelerates the vehicle speed in the vicinity of the rear vehicle to inform the rear vehicle that the subject vehicle wants to merge at a position ahead of the rear vehicle. The rear vehicle recognizes the vehicle decelerating around the rear vehicle and decelerates to let the subject vehicle merge into the space ahead. The distance between the front vehicle and the rear vehicle is widened, and the inter-vehicle distance becomes longer than the necessary inter-vehicle distance ($L_{MLIM}$). This enables the subject vehicle to perform the lane change. The deceleration control for informing the rear vehicle of the merging intention is performed, for example, in such a scene that the lane to be the merge destination is congested and the subject vehicle is planned to merge between the congested vehicles. The control from step S7 to step S14, which will be described below, corresponds to the control for informing the other vehicle of the merging intention.

When the present inter-vehicle distance ($L_M$) is less than the necessary inter-vehicle distance ($L_{MLIM}$), the control device 180 determines whether or not the rear vehicle is decelerating more than the subject vehicle in step S7. Specifically, the control device 180 compares the acceleration of the subject vehicle with the acceleration of the rear vehicle. When the rear vehicle is decelerating, in step S8, the control device 180 calculates the deceleration. The deceleration represents the width of the vehicle speed when the vehicle speed is decreased, and the control device 180 calculates the deceleration before decreasing the vehicle speed of the subject vehicle. The greater the difference between the present vehicle speed and the decreased vehicle speed is, the higher the deceleration is. The control device 180 calculates a vehicle speed difference for decreasing the present vehicle speed than the vehicle speed of the rear vehicle as the deceleration.

In step S9, the control device 180 compares the calculated deceleration with the deceleration upper limit value. The deceleration upper limit value is a predetermined value, and is indicated by an upper limit value of the range of the acceleration that does not affect the ride comfort of the occupant and the like. For example, when decelerating at the required deceleration results in a steep deceleration and affects the ride comfort of the occupant, the deceleration is set to a value close to the deceleration upper limit value, or a value higher than the deceleration upper limit value. Further, the deceleration upper limit value may be a value corresponding to the vehicle state of the subject vehicle and/or the vehicle state of the rear vehicle, and it may be an upper limit value of the acceleration capable of deceleration of the subject vehicle. For example, when the lane to be the merging destination is congested and the rear vehicle is almost stopped, even if the vehicle speed of the subject vehicle is reduced, the vehicle speed of the subject vehicle does not become lower than the vehicle speed of the other vehicle. In such a case, the deceleration becomes higher than the deceleration upper limit value, and even if the vehicle speed of the subject vehicle is reduced in accordance with the deceleration, the vehicle speed of the subject vehicle does not become lower than the vehicle speed of the other vehicle. For example, the control device 180 calculates the deceleration upper limit value so that as the higher the vehicle speed of the subject vehicle is than the vehicle speed of the rear vehicle, the higher the deceleration upper limit value is.

When the calculated deceleration is higher than the deceleration upper limit value, even if the subject vehicle is decelerated, the vehicle speed of the subject vehicle does not become lower than the vehicle speed of the other vehicle. The control device 180 determines that the inter-vehicle distance including the target point (the inter-vehicle distance between the front vehicle and the rear vehicle) does not become shorter than the necessary inter-vehicle distance even if the vehicle is decelerated, and terminates the control flow shown in FIG. 2.

When the calculated deceleration is equal to or less than the deceleration upper limit value, in step S10, the control device 180 executes the deceleration control for decreasing the vehicle speed of the subject vehicle based on the calculated deceleration. The deceleration control in the control process of step S10 needs not to be performed at this point in time, and may be performed in the control process of step S12. In step S11, the control device 180 determines whether or not the rear end of the subject vehicle is located ahead of the front end of the rear vehicle. Blinking of the direction indicator 170 is started in step S26 to be described later. Therefore, the control process in step S16 determines whether or not the subject vehicle is located at a position where the driver of the rear vehicle can visually recognize the blinking of the direction indicator 170 of the subject vehicle. When the rear end of the subject vehicle is not located ahead of the front end of the rear vehicle, the control device 180 executes the control processing in Step S7. When the rear end of the subject vehicle is located ahead of the front end of the rear vehicle, the control device 180 executes the control process in step S12.

In step S12, the control device 180 executes the deceleration control so that the vehicle speed of the subject vehicle is lower than the present vehicle speed. In step S13, the control device 180 calculates the necessary inter-vehicle distance. The calculation method of the necessary inter-vehicle distance is the same as the calculation method of step S5. In the example of FIG. 3, suppose that the driver of the rear vehicle Q notices that the subject vehicle A is decelerating at the position ahead of the rear vehicle Q and reduces the vehicle speed. At this time, as represented by Equation (1), since the vehicle speed $v_1$ of the rear vehicle Q is decreasing, the necessary inter-vehicle distance ($L_{MLIM}$) is shorter.

In step S14, the control device 180 calculates the inter-vehicle distance between the front vehicle and the rear vehicle based on the position of the front vehicle and the position of the rear vehicle, and compares the calculated inter-vehicle distance with the necessary inter-vehicle distance ($L_{MLIM}$). When the present inter-vehicle distance ($L_M$) is equal to or greater than the necessary inter-vehicle distance ($L_{MLIM}$), the control device 180 executes the control process in step S15. When the present inter-vehicle distance ($L_M$) is equal to or greater than the necessary inter-vehicle distance ($L_{MLIM}$), the control device 180 executes the control process in step S18. When the present inter-vehicle distance ($L_M$) is less than the necessary inter-vehicle distance ($L_{MLIM}$), the control device 180 determines that the inter-vehicle distance including the target point is not longer than the necessary inter-vehicle distance, and terminates the control flow shown in FIG. 2.

In the control process of S6, when determining that the present inter-vehicle distance ($L_M$) is equal to or greater than the necessary inter-vehicle distance ($L_{MLIM}$), the control device 180 sets the vehicle speed for the subject vehicle to overtake the rear vehicle, and controls the drive mechanism 160 so that the present vehicle speed matches the set vehicle speed (vehicle speed control).

In step S16, the control device 180 determines whether or not the rear end of the subject vehicle is located ahead of the front end of the rear vehicle. Blinking of the direction indicator 170 is started in step S26 to be described later. Therefore, the control process in step S16 determines whether or not the subject vehicle is located at a position where the driver of the rear vehicle can visually recognize the blinking of the direction indicator 170 of the subject vehicle. When the rear end of the subject vehicle is not located ahead of the front end of the rear vehicle, the control device 180 executes the control process in step S15. When the rear end of the subject vehicle is located ahead of the front end of the rear vehicle, the control device 180 executes the control process of step S17.

In step S17, the control device 180 executes the deceleration control so that the vehicle speed of the subject vehicle is lower than the current vehicle speed. The deceleration control is a control for controlling the vehicle speed, for example, at a predetermined range of deceleration so that the position of the subject vehicle is located between the front vehicle and the rear vehicle in the traveling direction of the subject vehicle. This deceleration control is also a control to inform the rear vehicle of the merging intention. That is, the driver of the rear vehicle grasps the merging intention by recognizing the decelerating vehicle at the front position. Thus, it is possible to inform the rear vehicle of the merging intention of the subject vehicle. Incidentally, the deceleration control need not be executed at the time when the rear end of the subject vehicle is located ahead of the front end of the rear vehicle, but may be performed after the time when the rear end of the subject vehicle is located ahead of the front end of the rear vehicle. For example, the control device 180 may perform the deceleration control when the position of the subject vehicle is at a midpoint between the front vehicle and the rear vehicle in the traveling direction of the subject vehicle.

In step S18, the control device 180 calculates the acceleration of the subject vehicle and the acceleration of the rear vehicle, and determines whether or not the relative acceleration of the subject vehicle relative to the rear vehicle is negative by comparing the calculated acceleration. The acceleration of the rear vehicle may be calculated by measuring the acceleration of the rear vehicle, or it may be calculated on the assumption that the rear vehicle is traveling at a constant speed. When the relative acceleration is negative, the subject vehicle can easily inform the driver of the rear vehicle of the merging intention of the subject vehicle, for example, since the subject vehicle is decelerating relative to the rear vehicle even when the rear vehicle is decelerating. Incidentally, when the inter-vehicle distance between the front vehicle and the rear vehicle is sufficiently long, the control process in step S18 may be omitted.

When the relative acceleration is positive or zero, in step S19, the control device 180 calculates the deceleration. The calculation processing of the deceleration is the same as that in step S8. In step S20, the control device 180 compares the calculated deceleration with the deceleration upper limit value, and determines whether or not the calculated deceleration is equal to or less than the deceleration upper limit value. The determination processing in step S20 is the same as that in step S9. When the calculated deceleration is equal to or less than the deceleration upper limit value, the control device 180 executes the control process of step S17. That is, when the relative acceleration is positive or zero in the determination process of step S18, the process returns to the control process of step S17. By this control loop, the acceleration of the subject vehicle is lowered when the acceleration of the subject vehicle is higher than the acceleration of the rear vehicle. On the other hand, when the calculated deceleration is higher than the deceleration upper limit value, the control device 180 determines that the inter-vehicle distance including the target point does not become longer than the necessary inter-vehicle distance even if the subject vehicle is decelerated, and terminates the control flow shown in FIG. 2.

In the determination in step S18, when determining that the relative acceleration is negative, in step S21, the control device 180 predicts the position relationship between the subject vehicle and the front vehicle after a predetermined time has elapsed using the vehicle speed of the front vehicle, the distance from the subject vehicle to the front vehicle, the vehicle speed of the subject vehicle, and the acceleration of the subject vehicle. Specifically, the control device 180 calculates the vehicle speed change from the present time to the elapse of a predetermined period of time on the assumption that the present acceleration of the front vehicle has remained constant from the present time until a predetermined time has elapsed. Similarly, the control device 180 calculates the vehicle speed change from the present time until a predetermined time has elapsed on the assumption that the present acceleration of the subject vehicle has remained constant from the present time until a predetermined time has elapsed. Then, by comparing the vehicle speed changes of the subject vehicle and the front vehicle from the present time until a predetermined time has elapsed, the control device 180 calculates the time at which the vehicle speed of the subject vehicle becomes lower than the vehicle speed of the front vehicle. If the time when the vehicle speed of the subject vehicle is lower than the vehicle speed of the front vehicle is calculated, the subject vehicle may overtake the front vehicle. That is, the control device 180 predicts the position relationship between the front vehicle and the subject vehicle at the elapse of the predetermined period of time based on the vehicle speed change of the subject vehicle and the front vehicle. Incidentally, the control device 180 may predict the position relationship between the front vehicle and the subject vehicle at the elapse of the predetermined period of time by calculating the future position of the front vehicle and the future position of the rear vehicle. The control device 180 calculates each moving distance of the subject vehicle and the other vehicle on the assumption that the present vehicle speed and the present acceleration have remained constant from the present time until a predetermined time has elapsed. Then, the control device 180 calculates the position of the front vehicle after a predetermined time has elapsed by adding the calculated moving distance to the present position of the front vehicle, and calculates the position of the subject vehicle after a predetermined time has elapsed by adding the calculated moving distance to the present position of the subject vehicle.

In step S22, the control device 180 determines whether or not the subject vehicle overtakes the front vehicle based on the prediction result obtained by the control processing in step S21. Specifically, the control device 180 determines whether the rear end of the subject vehicle at the elapse of a predetermined period of time is located ahead of or behind the rear end of the front vehicle at the elapse of a predetermined period of time using the position relationship between the subject vehicle and the front vehicle, which is predicted by the control processing in Step S21. When predicting that the rear end of the subject vehicle at the elapse of a predetermined period of time is located ahead of the rear end of the front vehicle at the elapse of a predetermined period of time, the control device 180 determines that the subject vehicle overtakes the front vehicle. On the other hand, when predicting that the rear end of the subject vehicle at the elapse of a predetermined period of time is located behind the rear end of the front vehicle at the elapse of a predetermined period of time, the control device 180 determines that the subject vehicle does not overtake the front vehicle. When determining that the subject vehicle overtakes the front vehicle, the control device 180 terminates the control flow shown in FIG. 2.

When determining that the subject vehicle does not overtake the front vehicle, in step S23, the control device 180 calculates the necessary inter-vehicle distance. The calculation method of the necessary inter-vehicle distance is the same as the calculation method of step S5. In S24, the control device 180 determines whether or not the inter-vehicle distance between the front vehicle and the rear vehicle is equal to or greater than the necessary inter-vehicle distance ($L_{MLIM}$). The determination processing in step S24 is the same as the determination processing in step S6. When the present inter-vehicle distance ($L_M$) is less than the necessary inter-vehicle distance ($L_{MLIM}$), the control device 180 determines that the inter-vehicle distance including the target point is not shorter than the necessary inter-vehicle distance, and terminates the control flow shown in FIG. 2. For the control processing of steps S23 and 24, since there is a possibility that the inter-vehicle distance and the necessary inter-vehicle distance may change due to change of the vehicle state of the subject vehicle and the other vehicle during the vehicle speed control described above, the control device 180 executes the control processing of steps S23 and 24.

In step S25, the control device 180 determines whether or not to start blinking of the direction indicator 170 based on the vehicle state of the subject vehicle and the vehicle state of the rear vehicle. Specifically, the control device 180 calculates the recognition distance in which the occupant of the rear vehicle can recognize the blink of the direction indicator 170. When the vehicle speed of the rear vehicle is high, the driver of the rear vehicle is looking at the distance, so even if the direction indicator starts blinking while the subject vehicle is in close proximity to the rear vehicle, the driver of the rear vehicle may not be able to recognize the blinking of the direction indicator. Therefore, the control device 180 calculates the recognition distance so that the higher the vehicle speed of the rear vehicle is, the longer the recognition distance is. Then, the control device 180 compares the inter-vehicle distance from the subject vehicle to the rear vehicle with the calculated recognize distance, and determines to start blinking of the direction indicator 170 when the inter-vehicle distance is equal to or greater than the recognition distance. On the other hand, when the inter-vehicle distance is less than the recognition distance, the control device 180 determines not to start blinking of the direction indicator 170, and executes the control process in step S23. Incidentally, the control device 180 may calculate the recognition distance so that the longer the recognition distance is as the relative speed of the subject vehicle relative to the rear vehicle is higher. When the relative speed of the subject vehicle relative to the rear vehicle is high, the subject vehicle merges the adjacent lane at a position relatively far from the rear vehicle. Therefore, the control device 180 may calculate the recognition distance so that the driver of the rear vehicle can recognize the blink of the direction indicator 170 at a distant position.

In step S26, the control device 180 starts blinking the direction indicator 170. In step 27, the control device 180 controls the steering while maintaining the present vehicle speed of the subject vehicle to move the subject vehicle from the subject lane to the adjacent lane so that the subject vehicle enters the lane change possibility area. Then, after the lane change, the control device 180 terminates the control flow of FIG. 2

As described above, the vehicle control device according to the present embodiment includes acquiring detection data of another vehicle traveling in an adjacent lane, setting, on the adjacent lane, a target point for a subject vehicle to change a lane from a travel lane to the adjacent lane based on a position relationship between the vehicle and the other vehicle, specifying the other vehicle that is located behind the target point as s rear vehicle, and starting blinking of a direction indicator of the subject vehicle when a rear end of the subject vehicle is located ahead of a front end of the target vehicle. Thus, starting blinking of the direction indicator at the timing at which the occupant of the rear vehicle can visually recognize the blink of the direction indicator enables the subject vehicle to easily inform the other vehicle of the merging intention of the subject vehicle.

Further, the vehicle control device according to the present embodiment includes calculating, based on the vehicle state of the rear vehicle and the vehicle state of the subject vehicle, a recognition distance indicating a distance in which an occupant of the rear vehicle recognize a blink of the direction indicator, and starting blinking of the direction indicator of the subject vehicle when an inter-vehicle distance between the subject vehicle and the rear vehicle is equal to or greater than the recognition distance. As a result, the direction indicator is not blinked in a state in which the subject vehicle is close to the rear vehicle. This prevents the rear occupant from giving an anxiety and enables the subject vehicle to inform the other vehicle of the merging intention of the subject vehicle.

Further, the vehicle control device according to the present embodiment includes starting blinking of the direction indicator of the subject vehicle when the relative acceleration of the subject vehicle relative to the rear vehicle is negative. Thus, since the driver of the rear vehicle can recognize that the subject vehicle is changing the vehicle speed for lane change, the subject vehicle can easily inform the other vehicle of the merging intention of the subject vehicle.

Further, the vehicle control device according to the present embodiment includes decreasing an acceleration of the subject vehicle when the acceleration of the subject vehicle is higher than the acceleration of the rear vehicle, and starting blinking of the direction indicator of the subject vehicle after the acceleration of the subject vehicle. Thus, since the driver of the rear vehicle can recognize that the subject vehicle is approaching the position ahead of the rear vehicle by changing the speed for lane change, the subject vehicle can easily inform the other vehicle of the merging intention of the subject vehicle.

Further, the vehicle control device according to the present embodiment includes predicting the position relationship between the front vehicle and the subject vehicle at an elapse of a predetermined period of time based on the vehicle state of the front vehicle and the vehicle state of the subject vehicle, determining whether or not the rear end of the subject vehicle at the elapse of the predetermined period of time is located behind the rear end of the front vehicle at the elapse of the predetermined period of time and starting blinking of the direction indicator 170 of the subject vehicle when determining, based on the predicted position relationship, that the rear end of the subject vehicle at the predetermined period of time is located behind the rear end of the front vehicle at the elapse of the predetermined period of time. Thus, since the blink of the direction indicator 170 is started in a state where the rear end of the vehicle is located behind the rear end of the front vehicle, the subject vehicle can easily inform the other vehicle of the merging intention of the subject vehicle.

In the control process of Step S21 and Step S22, the vehicle control device according to the present embodiment predicts the position relationship between the subject vehicle and the front vehicle after a predetermined time has elapsed in order to determine whether the subject vehicle overtakes the front vehicle but the prediction result of the position relationship may be used for other determination. For example, the control device 180 compares the distance from the front end of the subject vehicle after a predetermined time has elapsed to the position of the other vehicle after a predetermined time has elapsed with a predetermined distance threshold, based on the position relationship between the subject vehicle and the front vehicle after a predetermined time has elapsed. The predetermined distance threshold represents the upper limit distance for the rear vehicle to easily grasp the merging intention of the subject vehicle, and is determined by the position relationship or the vehicle speed difference between the subject vehicle and the rear vehicle.

Figure 4:
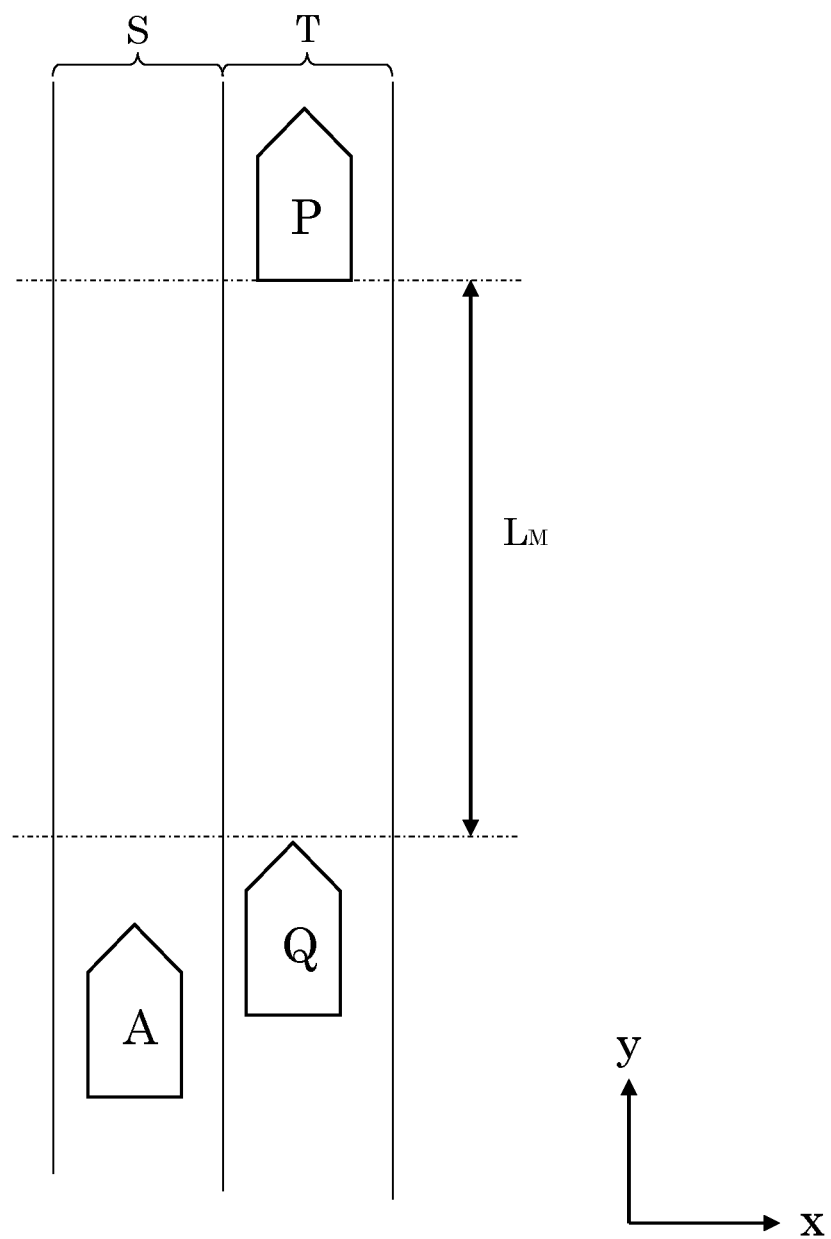
FIG. 4 is a diagram illustrating a scene in which the subject vehicle is approaching from the rear of the rear vehicle in order to execute a lane change.

For example, as in the example of FIG. 4, the subject vehicle is traveling in the travel lane S, and the front vehicle P and the rear vehicle Q is traveling in the adjacent lane T. The inter-vehicle distance ($L_M$) between the front vehicle P and the rear vehicle Q is sufficiently wide. In such a state, when the subject vehicle overtakes the rear vehicle Q and performs the lane change at a position close to the front vehicle P, there is a possibility that the driver of the rear vehicle Q determines that the subject vehicle is not intended to merge in front of the rear vehicle Q based on the state in which the subject vehicle is overtaking the rear vehicle Q and traveling toward the front vehicle P. To prevent such erroneous recognition, the control device 180, using the position relationship between the subject vehicle and the front vehicle P, which is predicted by the control process in step S21, determines whether the distance from the front end of the subject vehicle at the elapse of the predetermined period of time to the rear end of the other vehicle at the elapse of the predetermined period of time is equal to or greater than a predetermined distance threshold. When determining that the distance from the front end of the subject vehicle at the elapse of the predetermined period of time to the rear end of the front vehicle P at the elapse of the predetermined period of time is equal to or greater than the predetermined distance threshold, the control device 180 starts blinking of the direction indicator of the subject vehicle. Further, the control device 180 does not start blinking of the direction indicator of the subject vehicle when the distance from the front end of the subject vehicle at the elapse of the predetermined period of time to the rear end of the front vehicle at the elapse of the predetermined period of time is less than the predetermined distance threshold.

That is, the vehicle control device according to the present embodiment includes predicting the position relationship between the front vehicle and the subject vehicle at the elapse of the predetermined period of time based on the vehicle state of the front vehicle and the vehicle state of the subject vehicle, determining whether or not the distance from the front end of the subject vehicle at the elapse of the predetermined period of time to the rear end of the front vehicle at the elapse of the predetermined period of time is equal to or greater than a predetermined distance threshold value, and starting blinking of the direction indicator of the subject vehicle when determining that the distance from the front end of the subject vehicle at the elapse of the predetermined period of time to the rear end of the front vehicle at the elapse of the predetermined period of time is equal to or greater than the predetermined distance threshold value. For example, in a state where the inter-vehicle distance of a plurality of vehicles is wide, the subject vehicle, while securing the inter-vehicle distance between the front vehicle, starting blinking of the direction indicator 170 at a timing when the subject vehicle can easily inform the rear vehicle of the merging intention. Thus, the subject vehicle can easily inform the other vehicle of the merging intention of the subject vehicle.

EXPLANATIONS OF LETTERS OR NUMERALS

100 . . . Vehicle control device
110 . . . Sensor group
120 . . . The subject vehicle position detecting device
130 . . . Map database
140 . . . Navigation system
150 . . . Drive control device
160 . . . Drive mechanism
170 . . . Direction indicator
180 . . . Control device

The invention claimed is:

1. A vehicle control method executed by a processor for controlling a subject vehicle, comprising:
   acquiring, from a sensor for detecting a state of surroundings of the subject vehicle, detection data of another vehicle traveling in an adjacent lane adjacent to a travel lane in which the subject vehicle is traveling;
   setting, on the adjacent lane, a target point for the subject vehicle to change a lane from the travel lane to the adjacent lane based on a position relationship between the subject vehicle and the other vehicle;
   specifying the other vehicle that is located behind the target point as a rear vehicle;
   determining whether or not a rear end of the subject vehicle is located ahead of a front end of the rear vehicle;
   in response to the rear end of the subject vehicle being located ahead of the front end of the rear vehicle, executing a deceleration control so that a vehicle speed of the subject vehicle is lower than a present vehicle speed;
   determining whether or not a relative acceleration of the subject vehicle relative to the rear vehicle is negative; and
   starting blinking of a direction indicator of the subject vehicle in response to the rear end of the subject vehicle being located ahead of the front end of the rear vehicle and the relative acceleration of the subject vehicle relative to the rear vehicle being negative.

2. The vehicle control method according to claim 1, comprising:

detecting a vehicle speed of the rear vehicle with a sensor; and starting blinking of the direction indicator of the subject vehicle when an inter-vehicle distance between the subject vehicle and the rear vehicle is equal to or greater than a recognition distance, wherein the recognition distance being longer as the vehicle speed of the rear vehicle increases or as a relative speed of the subject vehicle relative to the rear vehicle increases.

3. The vehicle control method according to claim 1, comprising:

decreasing an acceleration of the subject vehicle when the acceleration of the subject vehicle is higher than the acceleration of the rear vehicle; and starting blinking of the direction indicator of the subject vehicle after decreasing the acceleration of the subject vehicle.

4. The vehicle control method according to claim 1, comprising:

specifying a front vehicle located ahead of the target point;

predicting the position relationship between the front vehicle and the subject vehicle at an elapse of a predetermined period of time based on a vehicle state of the front vehicle and the vehicle state of the subject vehicle;

determining whether or not the rear end of the subject vehicle at the elapse of the predetermined period of time is located behind the rear end of the front vehicle at the elapse of the predetermined period of time; and starting blinking of the direction indicator of the subject vehicle when determining that the rear end of the subject vehicle at the elapse of the predetermined period of time is located behind the rear end of the front vehicle at the elapse of the predetermined period of time.

5. The vehicle control method according to claim 1, comprising:

specifying a front vehicle located ahead of the target point;

predicting the position relationship between the front vehicle and the subject vehicle at an elapse of a predetermined period of time based on a vehicle state of the front vehicle and the vehicle state of the subject vehicle;

determining whether or not a distance from the front end of the subject vehicle at the elapse of the predetermined period of time to the rear end of the front vehicle at the elapse of the predetermined period of time is equal to or greater than a predetermined distance threshold; and starting blinking of the direction indicator of the subject vehicle when determining that the distance from the front end of the subject vehicle at the elapse of the predetermined period of time to the rear end of the front vehicle at the elapse of the predetermined period of time is equal to or greater than the predetermined distance threshold.

6. A vehicle control device comprising:

a sensor for detecting a state of surroundings of a subject vehicle; and a control device for controlling the subject vehicle, wherein the sensor detects another vehicle traveling in an adjacent lane adjacent to a travel lane in which the subject vehicle is traveling; and the control device is configured to:

set, on the adjacent lane, a target point for the subject vehicle to change a lane from the travel lane to the adjacent lane based on a position relationship between the subject vehicle and the other vehicle;

specify the other vehicle located behind the target point as a rear vehicle;

determine whether or not a rear end of the subject vehicle is located ahead of a front end of the rear vehicle;

in response to the rear end of the subject vehicle being located ahead of the front end of the rear vehicle, execute a deceleration control so that a vehicle speed of the subject vehicle is lower than a present vehicle speed;

determine whether or not a relative acceleration of the subject vehicle relative to the rear vehicle is negative; and start blinking of a direction indicator of the subject vehicle in response to the rear end of the subject vehicle being located ahead of the front end of the rear vehicle and the relative acceleration of the subject vehicle relative to the rear vehicle is negative.

* * * * *